A. K. PEHRSON.
RELEASE AND TAKE-UP DEVICE FOR BRAKES.
APPLICATION FILED NOV. 17, 1919.

1,422,125.

Patented July 11, 1922.
2 SHEETS—SHEET 1.

Witnesses
Frank C. Miller
Edythe L. Lambe

Inventor
Alfred K. Pehrson
G. P. Lambe
Attorney

A. K. PEHRSON.
RELEASE AND TAKE-UP DEVICE FOR BRAKES.
APPLICATION FILED NOV. 17, 1919.
1,422,125.
Patented July 11, 1922.
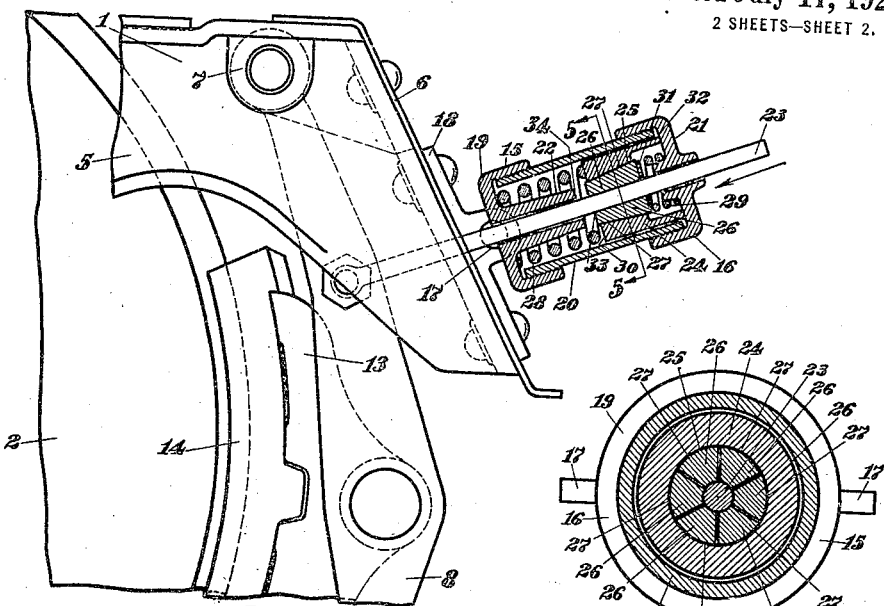
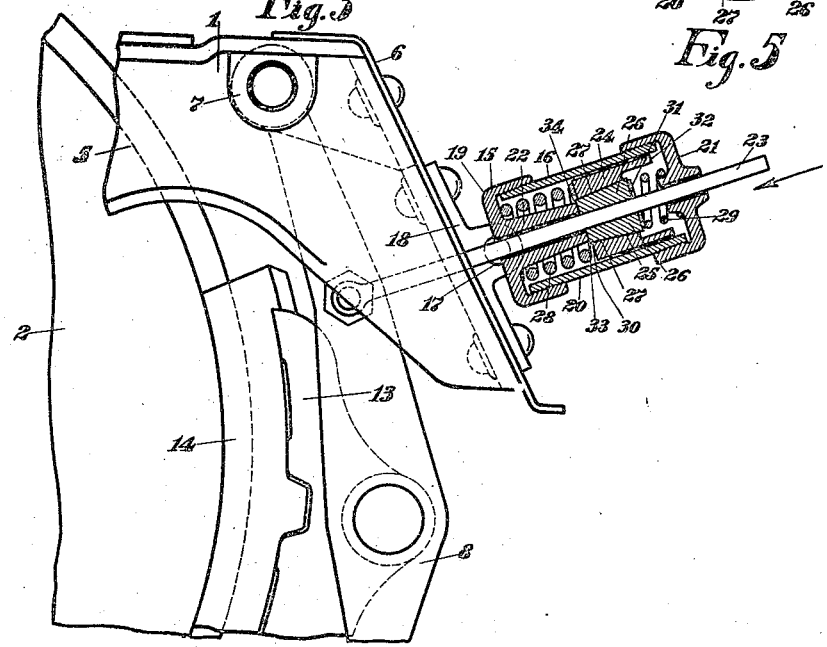
Fig. 3
Fig. 5
Fig. 4
Witnesses
Frank E. Miller
Edythe L. Lambe
Inventor
Alfred K. Pehrson,
By
W. Lambe,
Attorney

UNITED STATES PATENT OFFICE.

ALFRED K. PEHRSON, OF PITTSBURGH, PENNSYLVANIA, ASSIGNOR TO PRESSED STEEL CAR COMPANY, OF PITTSBURGH, PENNSYLVANIA, A CORPORATION OF NEW JERSEY.

RELEASE AND TAKE-UP DEVICE FOR BRAKES.

1,422,125.  Specification of Letters Patent.  Patented July 11, 1922.

Application filed November 17, 1919. Serial No. 338,497.

*To all whom it may concern:*

Be it known that I, ALFRED K. PEHRSON, a subject of the King of Sweden, residing in N. S. Pittsburgh, in the county of Allegheny and State of Pennsylvania, have invented certain new and useful Improvements in Release and Take-Up Devices for Brakes, of which the following is a specification.

This invention relates to brakes for railway car trucks and has for an object the provision of a device which will, when the brakes are being released move the brake shoes a predetermined distance from the tread of the wheel, i. e. will keep the distance between the tread of the wheel and the faces of the brake shoes, the same at all times when released regardless of any wearing away of the shoe, or the tread of the wheel, or both.

Another object of the invention is to provide a release device for brakes which will be automatically adjustable in such a manner that the brake shoes will move the same distance from the tread of the wheel at all times regardless of any wearing away of the brake shoes, the tread of the wheel or both.

Figure 1:
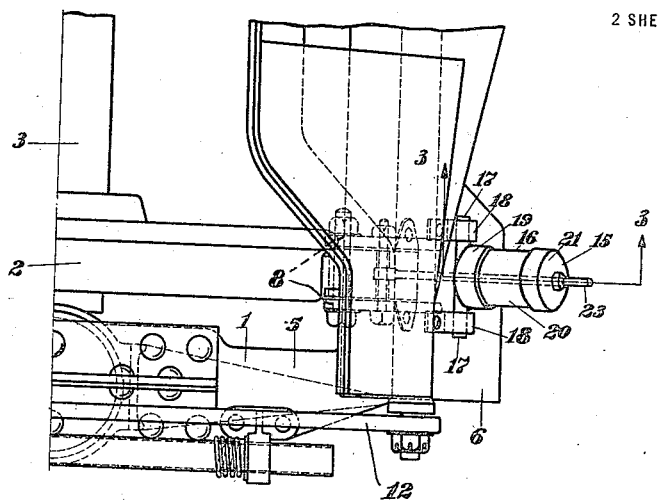
Figure 2:
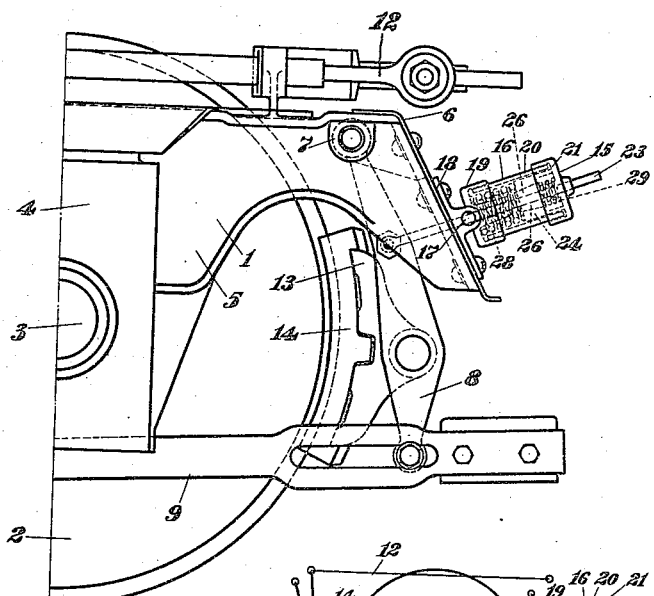
Figure 6:
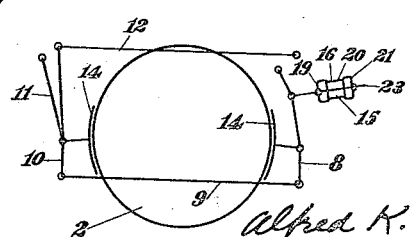

Referring to the drawings in which like reference characters refer to like parts, Fig. 1, is a plan view of a portion of a truck and brake mechanism with the invention embodied therein; Fig. 2, is a side elevational view of the same; Fig. 3, is an enlarged side elevational view of the same showing a portion of the brake in its released position, a portion of such view being in section and taken on the line 3—3 of Fig. 1; Fig. 4 is a like view showing the brake applied to the wheel; Fig. 5 is an enlarged cross-sectional view taken on the line 5—5 of Fig. 3; and Fig. 6 is a diagrammatic view of the brake mechanism, as applied to one wheel, showing the invention applied thereto.

Referring now in detail to the drawings the reference character 1 indicates a truck frame which may be of any desired form or construction, and 2 indicates the wheels which are mounted on axles 3 suitably journaled in axle boxes 4 mounted in the side frames. The truck frame illustrated in the drawings comprises spaced side frames 5 only one of which is shown, which are suitably connected by transverse members 6, only one of such members being shown. Each of the side frames 5 is provided with lugs 7 to which one end portion of a "dead lever" 8 is pivotally connected, the opposite end portion of such lever is pivotally connected with one of the end portions of a connecting rod 9, and the opposite end portion of such rod is pivotally connected with the lower end portion of a "live lever" 10, which lever is pivotally connected with a hanger 11 which is secured to the truck frame. The upper end portion of the lever 10 is connected with the pull rod 12 which is connected in any suitable manner to the remainder of the brake which forms no part of this invention. The levers 8 and 10 intermediate their ends are each provided with a brake shoe head 13 and brake shoe 14 which shoe is adapted to engage the wheel 2. To prevent the brake shoes from dragging on the wheel when the brake is in released position and to insure the same degree of movement of the brake shoes relative to the wheel at all times, an automatic device 15 is provided, such device comprising a casing member 16 having trunnions 17 at one end, which are pivotally mounted in bracket members 18 that are, in the present embodiment of the invention, secured to the end portion of the truck frame. This casing member 16 may be of any suitable form or construction but, as illustrated in the drawings, preferably comprises a base portion 19 having the trunnions 17 preferably formed integral therewith, a tubular portion 20 and a cap 21 all of which are secured together in any suitable manner. Within the casing member a stop member 22 is provided which is preferably integral with the base portion 19 and is preferably of annular form and of less diameter than the diameter of the interior of the casing. The base portion 19, stop member 22 and cap 21 are each provided with an opening through which a rod 23 passes, one end of such rod being pivotally connected with the lever 8. Within the casing member a wedge block 24 is provided which is movable in a direction longitudinally of the casing. This wedge block is formed with an interior tapering surface 25 that defines an opening in which segmental friction members 26 are mounted. The outer surfaces 27 of these members 26 are tapered to correspond with the tapered surface 25 of the wedge block, so that when the wedge block and friction members are in their proper operative positions the inner surface 25 of the wedge block and the outer surfaces 27 of the members 26 will frictionally engage each other. The inner surfaces of the members 26 are so shaped that when the members are in their proper operative positions in the wedge block 24 they form an opening through which the rod 23 passes and these surfaces are adapted to frictionally engage such rod. Within the casing springs 28 and 29 are provided, the spring 28 being interposed between the base portion 19 and the wedge block 24, and the spring 29 between the cap 21 and the friction members 26.

One end portion of the spring 28 is seated on the base portion 19 and the opposite end portion engages the end 30 of the wedge block 24, and is adapted to pull the brake shoe away from the wheel and also adapted to assist in retaining the wedge block and friction members in frictional engagement with each other, while one end portion of the spring 29 is seated on the cap 21 and the opposite end portion engages a plate 31 loosely mounted across the ends of the friction members 26, and is adapted to assist in retaining the friction members and wedge block in frictional engagement with each other. This plate is adapted to keep the force of the spring evenly distributed to each friction member, and may if desired be eliminated and the end of the spring made to engage all of the members 26. When the brake is in its released position as shown in Fig. 3 of the drawings, the end portion 32 of the wedge block 24 abuts against the cap 21 and prevents any excessive movement of the wedge block longitudinally of the casing in one direction, and is held in such position by the spring 28. When the wedge block 24 is in this position, the friction members 26, by reason of the engagement of their tapering surfaces 27 with the tapering surface 25 of the wedge block, will be forced inwardly into frictional engagement with the rod 23 and will be held in such engagement by the spring 29. It will be noted that when the brake is in released position that there is a space between the ends 33 of the friction members 26 and the end 34 of the stop member 22 which is proportionate to the space between the face of the shoe 14 and the tread of the wheel. When the brake is being applied, the rod 23, friction members 26 and wedge block 24 are moved in the direction as indicated by the arrows in Figs. 3 and 4, until the face of the shoe 14 engages the tread of the wheel, at which time the ends 33 of the friction members 26 will engage the end 34 of the stop member 22, and any wearing away of the shoe or the tread of the wheel, or both, causing a continued movement of the lever 8 toward the wheel, will cause the rod 23 to move between the friction members 26 a distance proportionate to such wear.

When the brake is being released, the spring 28, which has been compressed during the power application, forces the wedge block 24, friction members 26 and rod 23 in a direction opposite to that indicated by the arrows in Figs. 3 and 4, until the end portion 32 of the wedge block engages the cap 21 and has moved the brake shoe such a distance that the space between the face of the shoe and the tread of the wheel is proportionate to the space between the ends 33 of the friction members 26 and the end 34 of the stop member 22. The spring 28 not only pulls the shoe away from the wheel, but also serves to assist in retaining the wedge block in close engagement with the friction members, which block retains the friction members in engagement with the rod 23. It will be noted when the braking power is applied to the brake and the shoe is in engagement with the tread of the wheel and the ends 33 of the friction members are in engagement with the end 34 of the stop member 22, that as the shoe or tread of the wheel wears the power on the rod 23 becomes greater than the resistance due to the friction between the members 26 and the rod 23, and by reason of this the rod is permitted to move relative to the friction members a sufficient distance to compensate for such wear.

As hereinbefore described the casing member 16 is pivotally connected with the truck frame and by reason of this the device 15 will automatically assume the proper angle relative to the lever 8 and will thus prevent any binding of the parts when the brake is being operated.

In the present embodiment of the invention the movement of the several parts of the invention are proportionate to the movement of the brake shoe but it will be understood that the movement of these parts may be equal to the movement of the brake shoe when applied to other types of brakes.

The invention has been illustrated in the drawings applied to what is known as a clasp brake, i. e. a brake in which two brake shoes engage a single wheel but it will be understood that it may be applied to any other type of brake.

It will be apparent to those skilled in the art to which this invention appertains that many changes may be made in the construction and arrangement of the several parts of the invention without departing from the spirit and scope of the appended claims.

Having thus described the invention what I claim as new and desire to secure by Letters Patent is:—

1. In a brake mechanism, the combination with a car wheel, of a brake shoe adapted to engage said wheel when the braking power is applied and adapted to be moved out of engagement with said wheel when the braking power is released, mechanism for operating said shoe and means connected with said mechanism but not mounted thereon for maintaining a predetermined distance between the face of said shoe and the tread of said wheel every time the brake is released.

2. In a brake mechanism, the combination with a truck frame, of a car wheel, a brake shoe adapted to engage said wheel when the braking power is applied, said shoe being movable out of engagement with said wheel when the braking power is released, mechanism for operating said shoe and means connected with said mechanism and carried by said truck frame for limiting the release movement of said shoe whereby the distance between the face of said shoe and the wheel is maintained the same each time the brake is released.

3. In a brake mechanism, the combination with a car truck frame, of a car wheel, a brake shoe movable into and out of engagement with said wheel, mechanism for moving said shoe, and means mounted on said frame and connected with said mechanism for maintaining the face of the shoe a predetermined distance from said wheel when the brake is released, said means being adapted to compensate, when the brake is applied, for any wear of the face of the shoe or tread of the wheel.

4. In a brake mechanism, the combination with a car wheel, of a brake shoe adapted to engage said wheel when the brake is applied and adapted to be moved out of engagement with said wheel when the brake is released, mechanism for moving said shoe, an automatic friction means connected with said mechanism but not mounted thereon for maintaining a predetermined distance between the face of said shoe and the tread of said wheel every time the brake is released.

5. In a brake mechanism, the combination with a car truck frame, of a car wheel, a brake shoe movable into and out of engagement with said wheel, and a friction device mounted on said frame and connected with said mechanism for maintaining the face of the shoe a predetermined distance from said wheel when the brake is released, said means being adapted to compensate, when the brake shoe is applied to the wheel, for any wear of the face of the shoe or tread of the wheel.

6. In a brake mechanism, the combination with a car truck, of wheels journaled in said truck, brake shoes adapted to be moved into and out of engagement with said wheels, mechanism for operating said shoes and means mounted on said truck and connected with said mechanism adapted to maintain the face of each of said shoes a predetermined distance from the tread of the adjacent wheel when the brake is in released position.

7. In a brake mechanism, the combination with a car truck, of a wheel forming part of said truck, a brake shoe adapted to be moved into and out of engagement with said wheel, a casing mounted on said truck, a rod extending through said casing and connected with said brake, friction members in said casing adapted to engage said rod and movable therewith, means for limiting the movement of said members relative to said casing, said rod being movable relative to said friction members when the brake is applied.

8. In a brake mechanism, the combination with a car truck, of a truck frame, a wheel forming part of said truck, a brake shoe adapted to be moved into and out of engagement with said wheel, a casing mounted on said truck frame, a rod extending through said casing and connected with said brake, means in said casing adapted to engage said rod, and means for limiting the movement of said rod in one direction.

9. In a brake mechanism, the combination with a car truck, of a wheel forming part of said truck, a brake shoe adapted to move into and out of engagement with said wheel, and means for maintaining the same space between the face of said shoe and the tread of said wheel each time the brake is released, said means comprising a rod mounted on said truck and movable relative thereto, one end of said rod being connected with said brake, friction members adapted to engage and move with said rod, means for limiting the movement of said rod and members in one direction and means for limiting the movement of said friction members in the opposite direction.

10. In a brake mechanism, the combination with a car truck, of a wheel forming part of said truck, a brake shoe adapted to be moved into engagement with said wheel when the brake is applied, and movable out of engagement with said wheel when the brake is released, a casing member pivotally mounted on said truck, a rod connected with said brake and extending through said casing, friction members in said casing adapted to engage said rod, a wedge block adapted to engage said friction members, said rod, friction members and wedge block being movable relative to said casing, and a stop member in said casing adapted to limit the movement of said friction members when the brake is being applied, said wedge block being adapted to engage said casing and limit the movement of said friction members and rod in the opposite direction, and means in said casing adapted to maintain the wedge block and friction members in their proper operative positions relative to each other.

11. In a brake mechanism, the combination with a car truck, of a truck frame, a wheel forming part of said truck, a brake shoe adapted to engage said wheel when the brake is applied, means mounted on said truck frame connected with said brake adapted to move the shoe away from the wheel and maintain the face thereof the same distance away from the tread of the wheel, each time the brake is released, said means permitting the brake shoe to move toward the wheel when the brake is applied a distance equal to the wear of the face of the shoe and the tread of the wheel.

12. In a brake mechanism, the combination with a car truck, of a truck frame, a wheel forming part of said truck, a brake lever mounted on said truck, a brake shoe mounted on said lever adapted to be moved into and out of engagement with said wheel, and means pivotally mounted on said truck frame and connected with said lever adapted to limit the movement of the brake shoe, whereby the distance between the face of the shoe and the tread of the wheel is maintained the same after each application of the brake shoe to the wheel.

13. In a brake mechanism, the combination with brake shoes, of mechanism for operating said shoes, and means mounted on the truck frame and connected with said mechanism adapted to limit the release movement of said shoe, said means being automatically adjustable to compensate for wear.

14. In a brake mechanism, the combination with a truck frame, of a brake lever pivotally connected with said frame, a brake shoe connected with said lever, means for operating said lever and shoe, and means mounted on said frame and connected with said lever adapted to limit the movement of said lever and shoe in one direction.

15. In a brake mechanism, the combination with a truck frame, of a brake lever pivotally connected with said frame, a brake shoe connected with said lever, means for operating said lever and shoe, and friction means mounted on said frame and connected with said lever, adapted to limit the release movement of said lever and shoe, said friction means being automatically adjustable to compensate for wear.

In testimony whereof I affix my signature in the presence of two witnesses.

ALFRED K. PEHRSON.

Witnesses:
Frank E. Miller,
Edythe L. Lambe.